United States Patent
Chen et al.

(10) Patent No.: US 10,375,690 B2
(45) Date of Patent: Aug. 6, 2019

(54) SPECIAL SUBFRAME CONFIGURATION IN UNLICENSED SPECTRUM

(71) Applicant: QUALCOMM Incorporated, San Diego, CA (US)

(72) Inventors: Wanshi Chen, San Diego, CA (US); Tao Luo, San Diego, CA (US); Ravi Teja Sukhavasi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/819,178

(22) Filed: Aug. 5, 2015

(65) Prior Publication Data

US 2016/0044667 A1    Feb. 11, 2016

Related U.S. Application Data

(60) Provisional application No. 62/035,286, filed on Aug. 8, 2014.

(51) Int. Cl.
| | |
|---|---|
| *H04W 72/04* | (2009.01) |
| *H04L 5/00* | (2006.01) |
| *H04W 74/08* | (2009.01) |
| *H04L 1/18* | (2006.01) |
| *H04W 84/04* | (2009.01) |

(52) U.S. Cl.
CPC ....... *H04W 72/0446* (2013.01); *H04L 1/1887* (2013.01); *H04L 5/00* (2013.01); *H04W 74/0808* (2013.01); *H04W 84/045* (2013.01)

(58) Field of Classification Search
CPC ......... H04W 72/0446; H04W 74/0808; H04W 84/045; H04L 5/00
USPC .......................................................... 370/329
See application file for complete search history.

(56) References Cited

U.S. PATENT DOCUMENTS

| | | | | |
|---|---|---|---|---|
| 2007/0143655 A1* | 6/2007 | Niu | ................... | H03M 13/1102 |
| | | | | 714/752 |
| 2009/0180435 A1* | 7/2009 | Sarkar | ...................... | H04L 5/14 |
| | | | | 370/330 |

(Continued)

FOREIGN PATENT DOCUMENTS

WO    WO-2012/019321 A1    2/2012

OTHER PUBLICATIONS

WO 2012/019321 A1, International Publication Date: Feb. 16, 2012, Ericsson.*

(Continued)

*Primary Examiner* — Chi Tang P Cheng
(74) *Attorney, Agent, or Firm* — Arent Fox, LLP

(57) ABSTRACT

Apparatuses and methods for special subframe configuration in unlicensed spectrum are disclosed. For example, the disclosure presents an example method including identifying a time period for an extended clear channel assessment (ECCA) operation. Further, the example method may include determining a guard period portion included in a special subframe of a frame structure based on the identified time period. An apparatus may include means for identifying a time period for an extended clear channel assessment (ECCA) operation. Further, the example apparatus may include means for determining a guard period portion included in a special subframe of a frame structure based on the identified time period.

27 Claims, 13 Drawing Sheets

(56) References Cited

U.S. PATENT DOCUMENTS

| | | | | |
|---|---|---|---|---|
| 2012/0224521 | A1* | 9/2012 | Zhu | H04W 52/0216 370/311 |
| 2013/0017794 | A1* | 1/2013 | Kloper | H04W 74/0808 455/63.1 |
| 2014/0185535 | A1 | 7/2014 | Park et al. | |
| 2014/0376532 | A1* | 12/2014 | Sun | H04W 74/0816 370/338 |

OTHER PUBLICATIONS

International Search Report and Written Opinion—PCT/US2015/044006—ISA/EPO—dated Oct. 26, 2015. (9 pages).

Alcatel-Lucent et al., "Review of Regulatory Requirements for Unlicensed Spectrum", 3GPP Draft; RP-140808 Regulatory Review V3-Clean, 3rd Generation Partnership Project (3GPP), Mobile Competence Centre 650, Route Deslucioles, F-06921, Sophia-Antipolis Cedex; France vol. TSG RAN, No. Sophia-Antipolis, France; Jun. 10, 2014-Jun. 13, 2014, Jun. 6, 2014 (Jun. 6, 2014), XP050781790, 25 pages.

Catt, "Listen Before Talk for LAA," 3GPP TSG RAN WG1 Meeting# 79, R1-144625, Nov. 21, 2014, 3GPP, San Francisco, USA, http://www.3gpp.org/ftp/tsg_ran/WG1_RL1/TSGR1_79/Docs/R1-144625.zip (accessed Oct. 27, 2017), 6 pages.

Nokia Networks et al., "Listen Before Talk and Channel Access[online]", 3GPP TSG-RAN WG1#78b, R1-144187, Oct. 6, 2014, Retrieved from the Internet: URL:http://www.3gpp.org/ftp/tsg_ran/WG1_RL1/TSGR1_78b/Docs/R1-144187.zip>, 5 pages.

Nokia Networks et al., "On Listen Before Talk and Channel Access", 3GPP Draft; R1-145003, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 1, 2014-Nov. 21, 2014 Nov. 17, 2014 (Nov. 17, 2014), XP050895111, Retrieved from the Internet: URL: http//www.3gpp.org/ftp/Meetings_3GPP_SYNC/RAN1/Docs/[retrieved on Nov. 17, 2014] paragraph [0003]—paragraph [0005].

Nvidia: "Frame structure considerations for LAA [online]", 3GPP TSG-RAN WG1#80 R1-150513, Feb. 9, 2015, Retrieved from the Internet: <URL:http://www.3gpp.org/ftp/tsg_ran/WG1_RL1/TSGR1_80/Docs/R1-150513.zip>, 7 pages.

Nvidia: "Discussion on Potential Solutions for LAA-LTE," 3GPP Draft; R1-145013, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 17, 2014-Nov. 21, 2014, Nov. 17, 2014 (Nov. 17, 2014), XP050876059, Retrieved from the Internet: URL: http://www.3gpp.org/ftp/Meetings_3GPP_SYNC/RAN1/Docs/, [retrieved on Nov. 17, 2014], Section 3.1.

* cited by examiner

SPECIAL SUBFRAME CONFIGURATION IN UNLICENSED SPECTRUM

CROSS-REFERENCE

This application claims priority to Provisional Application No. 62/035,286 entitled "SPECIAL SUBFRAME CONFIGURATION IN UNLICENSED SPECTRUM" filed on Aug. 8, 2014, and assigned to the assignee hereof and hereby expressly incorporated by reference herein.

BACKGROUND

Aspects of this disclosure relate generally to telecommunications, and more particularly to special subframe configuration in unlicensed spectrum communications.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

Further, the massive growth in data traffic on both mobile and wireline networks and the proliferation of smart phones and other connected devices continue to put pressure on network operators to increase capacity. For mobile network operators, spectrum is a fundamental resource in this pursuit. However, the licensed spectrum, especially the valuable low-frequency bands with low propagation loss traits, is limited, and is rapidly being exhausted by a dense and growing subscriber base. With a significant amount of unlicensed spectrum globally available in the 5 GHz band (and other bands), the mobile operators and vendors are looking to use unlicensed spectrum to augment the capacity of licensed frequency carriers. As such, LTE in unlicensed spectrum, sometimes referred to as LTE over unlicensed spectrum or simply LTE-U, is proposed to utilize unlicensed spectrum to carry data traffic for mobile services with the initial focus on the 5725-5850 MHz band for this use.

In LTE in unlicensed spectrum, a load-based equipment (LBE) may be configured to perform an extended clear channel assessment (ECCA) check in which the operating channel that corresponds to the unlicensed spectrum is observed for a duration. As such, the LBE may determine that the operating channel is clear for transmitting data after the operating channel is silent for at least the duration. As referenced herein, an LBE may refer to an equipment where the transmit/receive structure is not fixed in time but determined by communication demand. Further, aligning the duration across cells of a same operator may help aligning idle time/transmission time among different cells or user equipment (UE) and help increase frequency reuse within the same operator.

SUMMARY

The following presents a simplified summary of one or more aspects of the disclosure in-order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Systems and methods for special subframes configuration in unlicensed spectrum are disclosed. For example, the disclosure presents an example method including identifying a time period for an extended clear channel assessment (ECCA) operation. Further, the example method may include determining a guard period portion included in a special subframe of a frame structure based on the identified time period.

In another aspect, the present disclosure presents an apparatus that may include means for identifying a time period for an ECCA operation. Further, the example apparatus may include means for determining a guard period portion included in a special subframe of a frame structure based on the identified time period.

In an additional aspect, the present disclosure presents a computer-readable storage medium that may include executable instructions that cause a computer or processor to identify a time period for an ECCA operation. Further, the instructions may cause the processor to determine a guard period portion included in a special subframe of a frame structure based on the identified time period.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
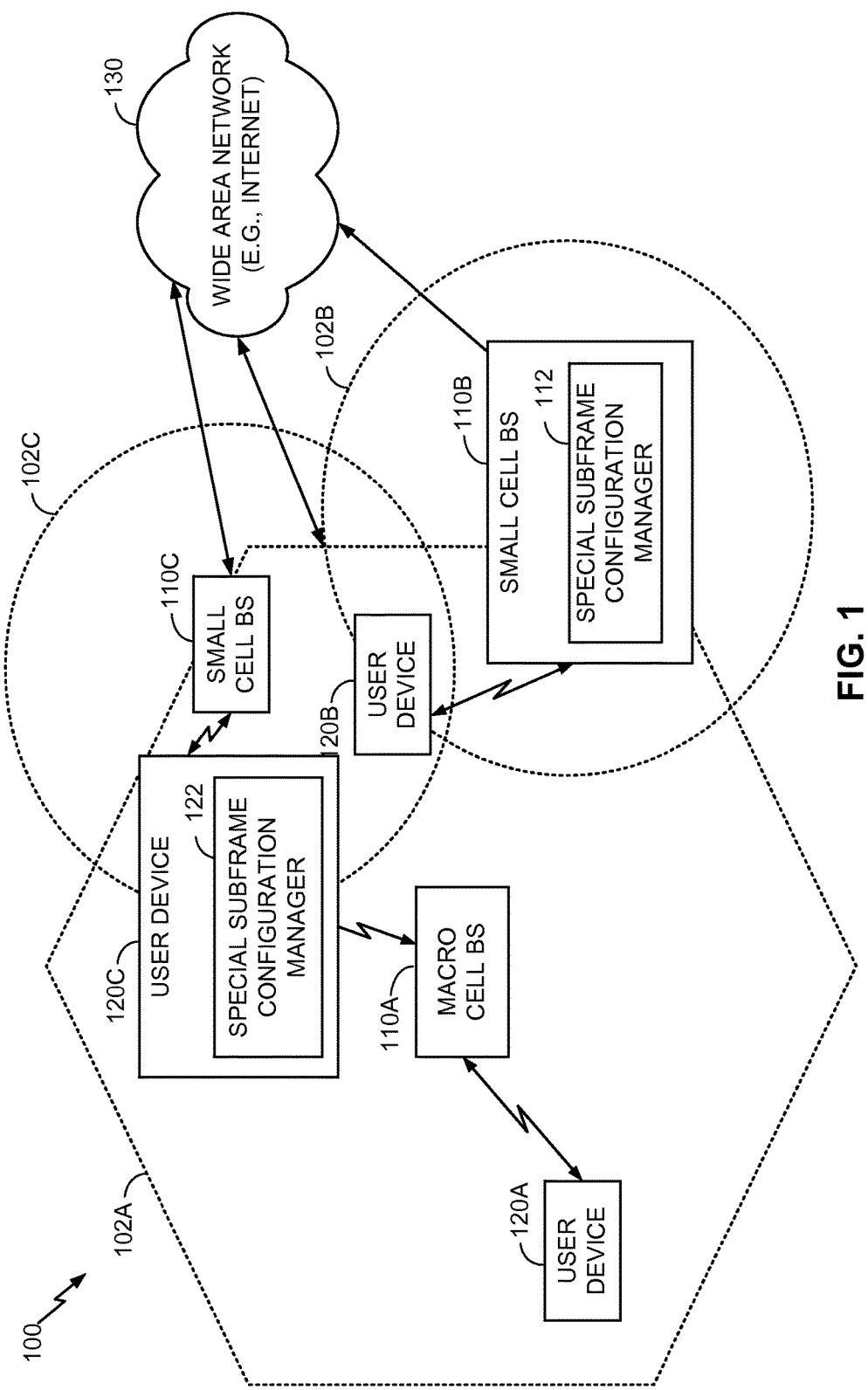
FIG. 1 illustrates an example mixed-deployment wireless communication system including macro cell base stations and small cell base stations.

The present disclosure relates generally to special subframe configuration in unlicensed spectrum. In LTE in unlicensed spectrum, a frame structure of a load-based equipment (LBE) may include a number of subframes, e.g., 10 subframes in one frame. The frame can be a 10 millisecond (ms) frame or a 5 ms frame, for example. The subframes may include one or more special subframes. In at least one aspect, a special subframe may include a downlink (DL) portion, a guard period (GP) portion, and an uplink (UL) portion. While the GP portion may typically occur in the middle of the special subframe, the DL portion may occur at the start of the special subframe or at the end of the special subframe, similarly with the UL portion. As referenced herein, a DL portion and a UL portion may respectively refer to portions of the special subframe allocated for switching the LBE from receiving to transmitting, or vice versa. The GP portion of the special subframe may refer to a portion that includes at least a time period for which the equipment may observe the operating channel before initiating data transmission. The LBE may either refer to a UE or a base station, e.g., an e Node B (eNB). The LBE may also be alternatively referred to as "equipment."

In LTE in unlicensed spectrum, the equipment may be configured to perform an extended clear channel assessment (ECCA) check to determine that the operating channel is clear for transmitting data. In performing the ECCA check, the operating channel that corresponds to the unlicensed spectrum is observed for the time period included in the GP portion. If the operating channel is clear, i.e., other equipment does not transmit/receive data over the operating channel for at least the time period, the equipment may determine that the operating channel is clear for transmitting/receiving data and may initiate data transmission/reception thereafter.

In at least some aspects, the time period may be determined based on an integer ("N" as referenced hereinafter) and a clear channel assessment (CCA) observation time (e.g., 20 microseconds (μs)), in which the N defines the number of clear idle slots that may be observed before the initiation of data transmission/reception. That is, in at least these aspects, the duration of the time period may be determined by multiplying the CCA observation time by the integer N.

Further to the aspects, the integer N may be randomly selected from a range from one to an upper limit integer ("q" as referenced hereinafter), e.g., generated by a function of frame index, PLMN ID, a random value, and/or subframe index. The value of q may be selected, by the manufacturer of the node or the equipment, from a range, e.g., from 4 to 32, and presumed to be invariable during the data transmission/reception process. Since the integer q indicates the maximum value of the integer N, the equipment may be configured to observe the operating channel for a time period determined by multiplying the CCA observation time by the integer q so that the amount of time needed for a CCA check may always be satisfied regardless of the actual value of the integer N.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example mixed-deployment wireless communication system, in which small cell base stations are deployed in conjunction with and to supplement the coverage of macro cell base stations. As used herein, small cells generally refer to a class of low-powered base stations that may include or be otherwise referred to as femto cells, pico cells, micro cells, etc. As noted in the background above, they may be deployed to provide improved signaling, incremental capacity growth, richer user experience, and so on.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the special subframe configuration discussed briefly above. For example, one or more of the small cell base stations 110 may include a special subframe configuration manager 112, while one or more of the user devices 120 may include a special subframe configuration manager 122.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL), e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

As shown in FIG. 1, the user device 120C may include a special subframe configuration manager 122 and the small cell BS 110B may include a special subframe configuration manager 112. FIG. 1, however, need not be limiting and additional or different devices may include special subframe configuration managers similar to 112 and 122. The special subframe configuration managers 112 and 122 may be configured to performed at least a portion of the features described herein to configure special subframes in a frame architecture for communications in unlicensed spectrum such as, for example, LTE in unlicensed spectrum.

For illustration purposes, an example downlink and uplink frame structure for an LTE signaling scheme is described below with reference to FIGS. 2-3.

Figure 2:
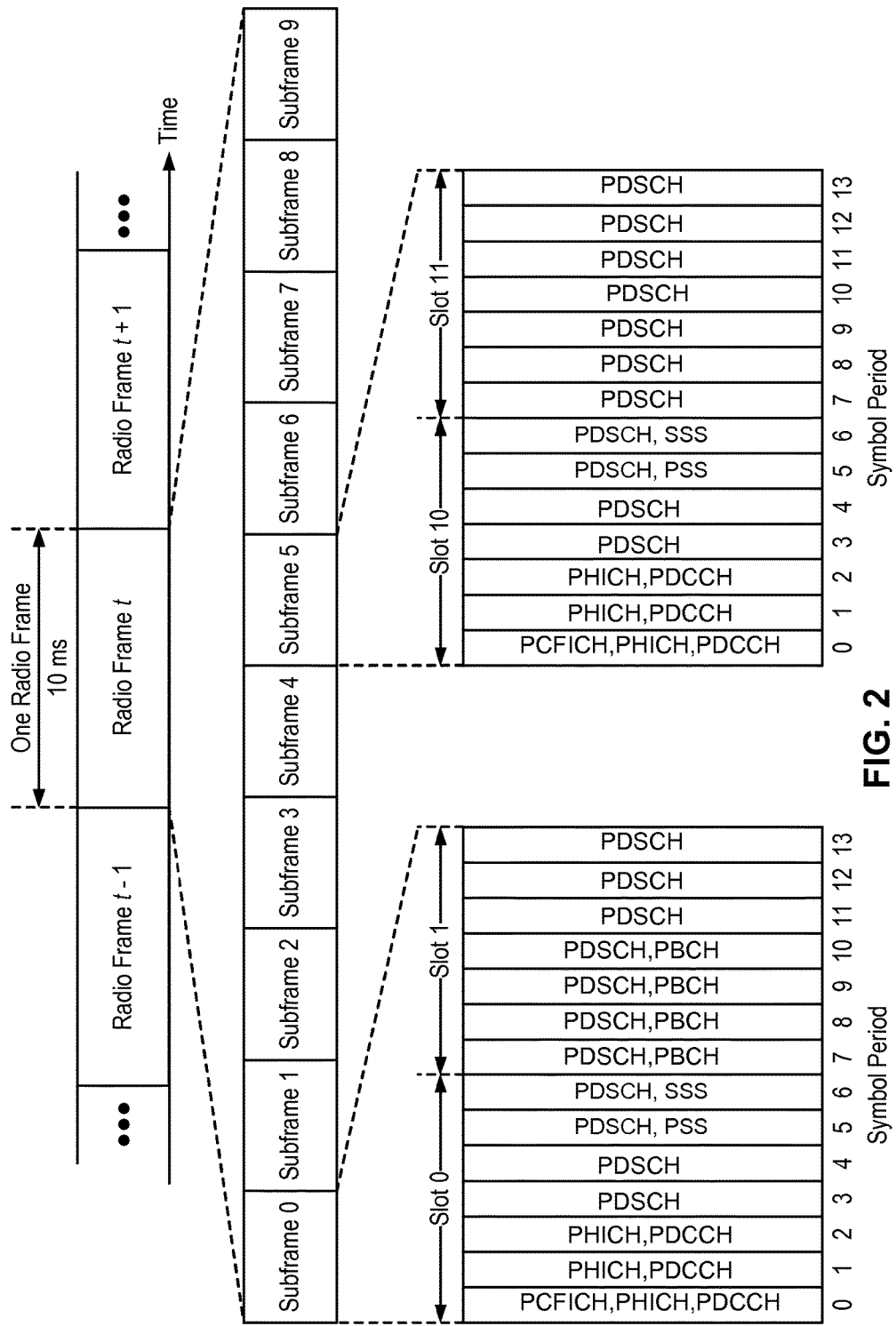
FIG. 2 is a block diagram illustrating an example downlink frame structure for LTE communications.

FIG. 2 is a block diagram illustrating an example downlink frame structure for LTE communications, which may include communications in LTE over unlicensed spectrum. In LTE, the base stations 110 of FIG. 1 are generally referred to as eNBs and the user devices 120 are generally referred to as UEs. The transmission timeline for the downlink may be partitioned into units of radio frames. Each radio frame may have a predetermined duration (e.g., 10 ms) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
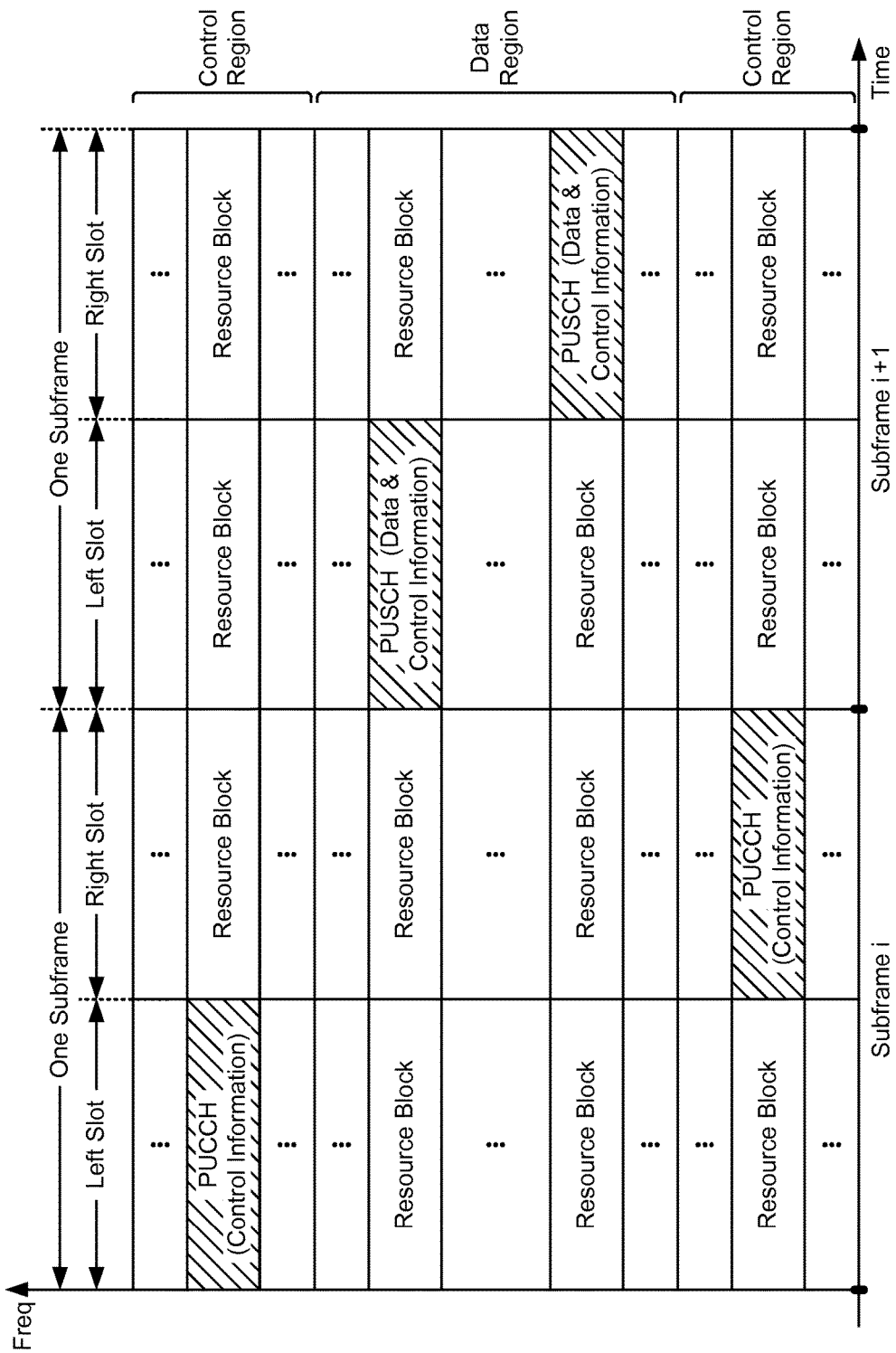
FIG. 3 is a block diagram illustrating an example uplink frame structure for LTE communications.

FIG. 3 is a block diagram illustrating an example uplink frame structure for LTE communications, which may include communications in LTE over unlicensed spectrum. The available resource blocks (which may be referred to as RBs) for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band are otherwise the same or substantially the same as in the LTE standard described in 3GPP TS 36.211, entitled "Evolved Universal Terrestrial Radio Access (E-UTRA); Physical Channels and Modulation," which is publicly available.

The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user (e.g., an anchor licensed carrier in LTE SDL or a designated one of the unlicensed carriers in LTE Standalone) and the remaining carriers serving as respective Secondary Cells (SCells). In this way, the PCell may provide a Frequency Division Duplexed (FDD) pair of downlink and uplink carriers (licensed or unlicensed), with each SCell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station designs, the small cell base station may include such a native RAT radio co-located with its cellular radio. According to various aspects described herein, the small cell base station may leverage the co-located radio to facilitate co-existence between the different RATs when operating on a shared unlicensed band. For example, the co-located radio may be used to conduct different measurements on the unlicensed band and dynamically determine the extent to which the unlicensed band is being utilized by devices operating in accordance with the native RAT. The cellular radio's use of the shared unlicensed band may then be specially adapted to balance the desire for efficient cellular operation against the need for stable co-existence.

Figure 4A:
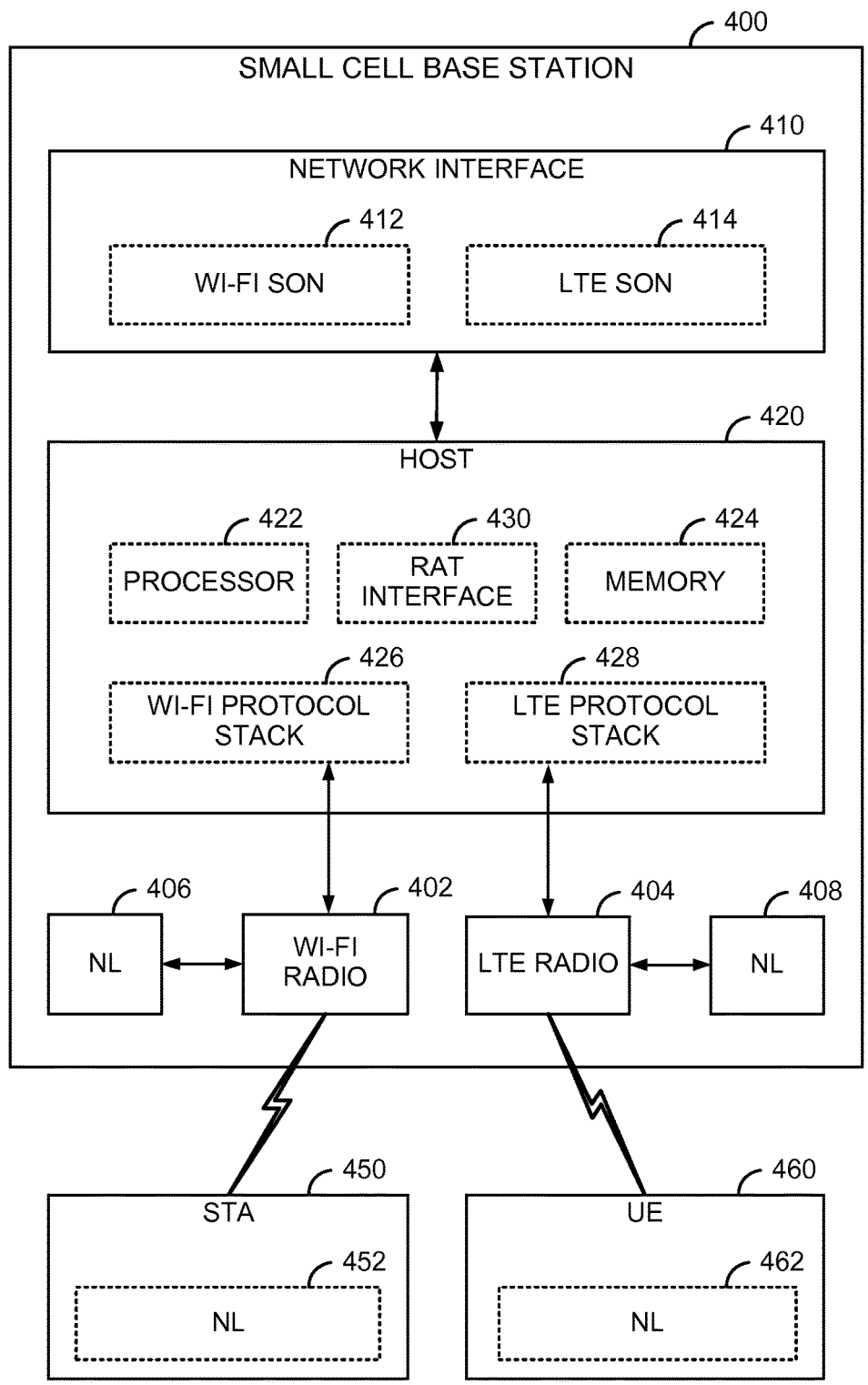
FIG. 4A illustrates an example small cell base station with co-located radio components (e.g., LTE and Wi-Fi) configured for unlicensed spectrum operation.

FIG. 4A illustrates an example small cell base station with co-located radio components configured for unlicensed spectrum operation. The small cell base station 400 may correspond, for example, to one of the small cell base stations 110B, 110C illustrated in FIG. 1. In this example, the small cell base station 400 is configured to provide a WLAN air interface (e.g., in accordance with an IEEE 802.11x protocol) in addition to a cellular air interface (e.g., in accordance with an LTE protocol). For illustration purposes, the small cell base station 400 is shown as including an 802.11x radio component/module (e.g., transceiver) 402 co-located with an LTE radio component/module (e.g., transceiver) 404. It is to be understood that the LTE radio component/module 404 may be configured to transmit/receive signals over an unlicensed frequency spectrum.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging). In some designs, the advantages discussed herein may be achieved by adding a radio component of the native unlicensed band RAT of interest to a given cellular small cell base station without that base station necessarily providing corresponding communication access via the native unlicensed band RAT (e.g., adding a Wi-Fi chip or similar circuitry to an LTE small cell base station). If desired, a low functionality Wi-Fi circuit may be employed to reduce costs (e.g., a Wi-Fi receiver simply providing low-level sniffing).

Returning to FIG. 4A, the Wi-Fi radio 402 and the LTE radio 404 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 406 and 408, respectively, or any other suitable component(s). Alternatively, the LTE radio 404 may be replaced by other components that perform monitoring other channels in unlicensed spectrum. The Wi-Fi radio 402 may only refer to a non-limiting example of components monitoring channels in unlicensed spectrum. The unlicensed spectrum is not limited to frequency resource for Wi-Fi standard.

The small cell base station 400 may communicate with one or more user devices via the Wi-Fi radio 402 and the LTE radio 404, illustrated as an STA 450 and a UE 460, respectively. Similar to the Wi-Fi radio 402 and the LTE radio 404, the STA 450 includes a corresponding NL module 452 and the UE 460 includes a corresponding NL module 462 for performing various operating channel or environment measurements, either independently or under the direction of the Wi-Fi radio 402 and the LTE radio 404, respectively. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4A shows a single STA 450 and a single UE 460 for illustration purposes, it will be appreciated that the small cell base station 400 can communicate with multiple STAs and/or UEs. Additionally, while FIG. 4 illustrates one type of user device communicating with the small cell base station 400 via the Wi-Fi radio 402 (i.e., the STA 450) and another type of user device communicating with the small cell base station 400 via the LTE radio 404 (i.e., the UE 460), it will be appreciated that a single user device (e.g., a smartphone) may be capable of communicating with the small cell base station 400 via both the Wi-Fi radio 402 and the LTE radio 404, either simultaneously or at different times.

As is further illustrated in FIG. 4A, the small cell base station 400 may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 400 may also include a host 420, which may include one or more general purpose controllers or processors 422 and memory 424 configured to store related data and/or instructions. The host 420 may perform processing in accordance with the appropriate RAT(s) used for communication (e.g., via a Wi-Fi protocol stack 426 and/or an LTE protocol stack 428), as well as other functions for the small cell base station 400. In particular, the host 420 may further include a RAT interface 430 (e.g., a bus or the like) that enables the radios 402 and 404 to communicate with one another via various message exchanges.

The host 420 and/or the LTE radio 404 in the small cell base station 400 may be configured to perform one or more of the features described herein with respect to special subframe configuration in unlicensed spectrum. In some aspects, the small cell base station 400 may include a special subframe configuration manager 112 (FIG. 1) configured to perform base station-level operations as described herein and associated with special subframe configuration in unlicensed spectrum.

The UE 460 may be configured to perform one or more of the features described herein with respect to special subframe configuration in unlicensed spectrum. In some aspects, the UE 460 may include a special subframe configuration manager 122 (FIG. 1) configured to perform UE-level operations as described herein and associated with special subframe configuration in unlicensed spectrum.

As a further enhancement, special subframe configuration in unlicensed spectrum is described in greater detail in accordance with the following figures.

Figure 4B:
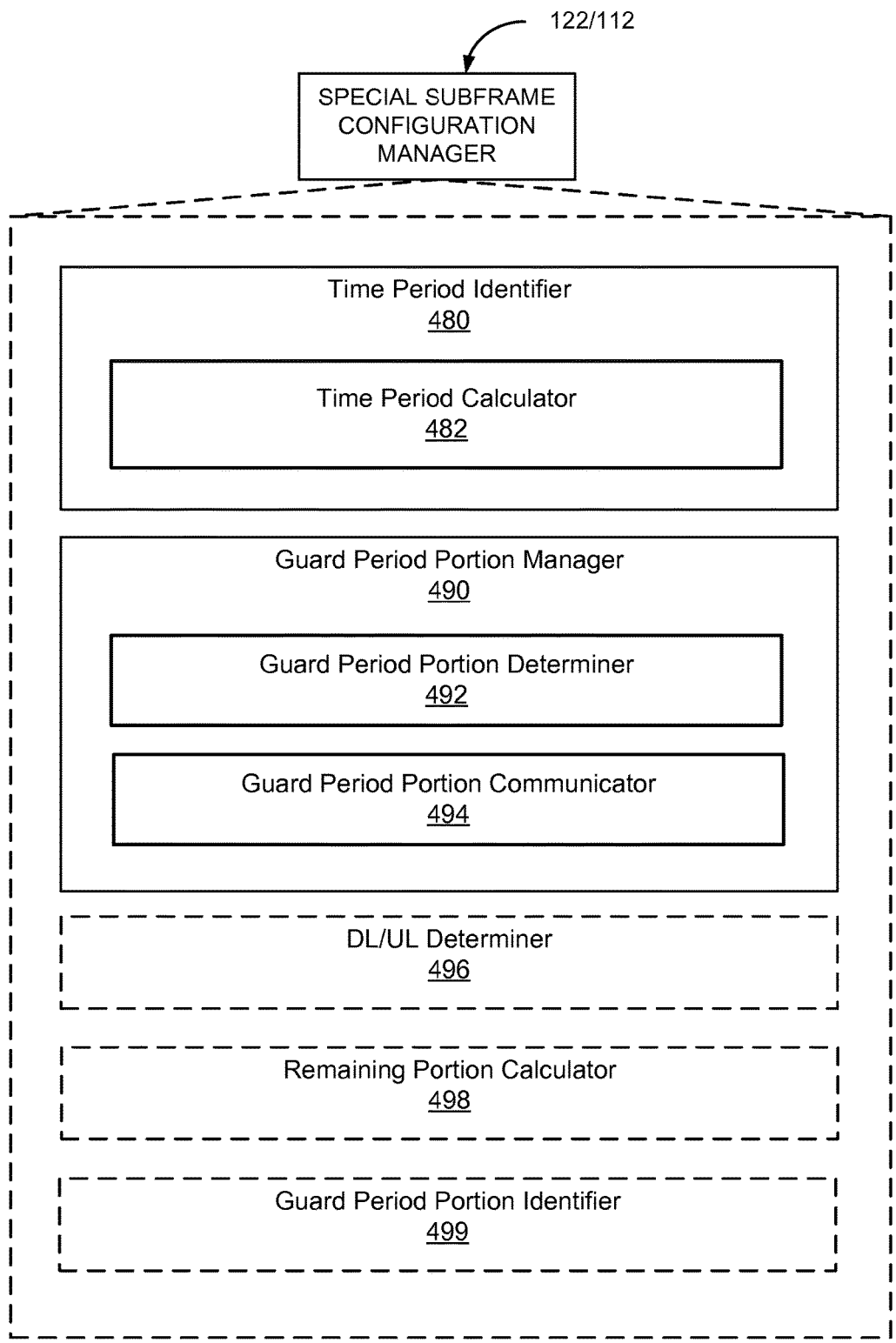
FIG. 4B illustrates example sub-components by which special subframe configuration may be implemented.

FIG. 4B illustrates example sub-components by which special subframe configuration may be implemented. As depicted, special subframe configuration manager 112/122 may include one or more sub-components including time period identifier 480, timer period calculator 482, guard period portion manager 490, guard period portion determiner 492, guard period portion communicator 494, DL/UL determiner 496, remaining portion calculator 498, and guard period portion identifier 499.

Time period identifier 480 may be configured to identify a time period for an ECCA check based on the value of N or the value of q for a respective special subframe. The value of q that is selected by the manufacturer of the node or the equipment and the value of N may be different in different frames or in different subframes. That is, time period calculator 482 included in time period identifier 480 may be configured to calculate the time period by multiplying a CCA observation time by N or q. For example, time period calculator 482 may calculate the time period for special subframe 502 (FIG. 5) to be equal than $q_{eNB} \times 20$ μs and calculate the time period for special subframe 504 (FIG. 5) to be equal to $q_{UE} \times 20$ μs. For another example, time period calculator 482 may calculate the time period for special subframe 602 (FIG. 6) to be equal to $N_{eNB} \times 20$ μs and calculate the time period for special subframe 604 (FIG. 6) to be equal to $N_{UE} \times 20$ μs.

Further, guard period portion manager 490 may be configured to determine a guard period portion (e.g., GP 614 in FIG. 6) for the respective special subframe based on the identified time period. In an aspect, guard period portion manager 490 may be configured to determine the guard period portion dynamically on a frame-by-frame basis. In addition to the time period, guard period portion manager 490 may further consider other factors including inter-cell interference protection, UL timing advance, etc. Thus, the GP portion may be determined to be equal to or greater than the identified time period.

That is, guard period portion determiner 492 may determine the guard period portion based on at least one of a time offset or a minimal guard period portion. Alternatively, guard period portion determiner 492 may determine the guard period portion based on a set of supported guard period portions. For example, guard period portion communicator 494 of special subframe configuration manager 112 may transmit the set of supported guard period portions in a broadcast message or a dedicated message.

In an non-limiting example of the disclosure, assuming a duration of a symbol is 71 μs, the value of N is selected as 20, and the ECCA observation time is specified as 20 μs, guard period portion determiner 492 may determine the duration of the GP portion by the following equation:

$$\text{Duration of } GP \text{ portion} = \text{ceiling}\left(\frac{N \times ECCA \text{ observation time}}{\text{duration of a symbol}}\right) + 1$$

in which ceiling (x) may refer to a smallest integer not less than x. Accordingly, the duration of the GP portion is determined to be ceiling (400/71)+1 symbols, i.e., 7 symbols.

Figure 6:
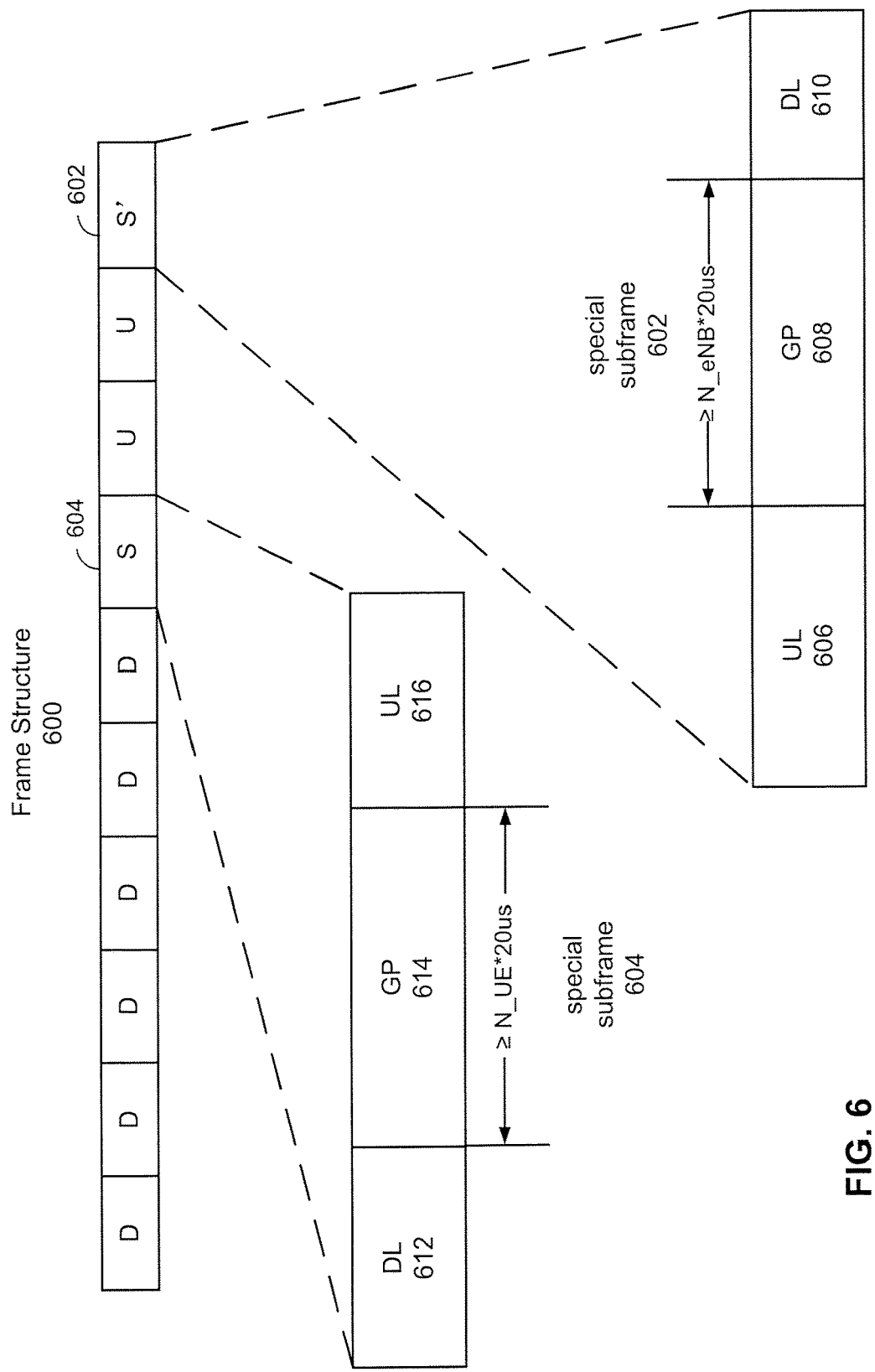
FIG. 6 illustrates other examples of special subframes of a frame structure in which special subframe configuration may be implemented.

Further, DL/UL determiner 496 may determine either a DL portion or an UL portion of the special subframe. For example, DL/UL determiner 496 may receive information regarding UL portion 616 and DL portion 610 (FIG. 6) via SIB blocks or dedicated messages. Time period identifier 480 may then identify a time period based on the value of q or the value of N. In either aspect, the duration of the time period may be identified and thus, GP portions 608 and 614 (FIG. 6) may be further determined based on the time period and other above identified considerations. Remaining portion calculator 498 may calculate remaining portions of the respective special subframe, assuming the duration of a special subframe is 1 ms. That is, UL portion 606 of special subframe 602 (FIG. 6) may be calculated by subtracting the duration of GP portion 608 and DL portion 610 (FIG. 6)

from 1 ms. Similarly, DL portion 612 of special subframe 604 (FIG. 6) may be calculated by subtracting the duration of GP portion 614 and UL portion 616 (FIG. 6) from 1 ms.

In addition, guard period portion identifier 499 may be configured to identify two or more sets of supported guard periods corresponding to two or more special subframes based on signaling received from a network entity.

Figure 5:
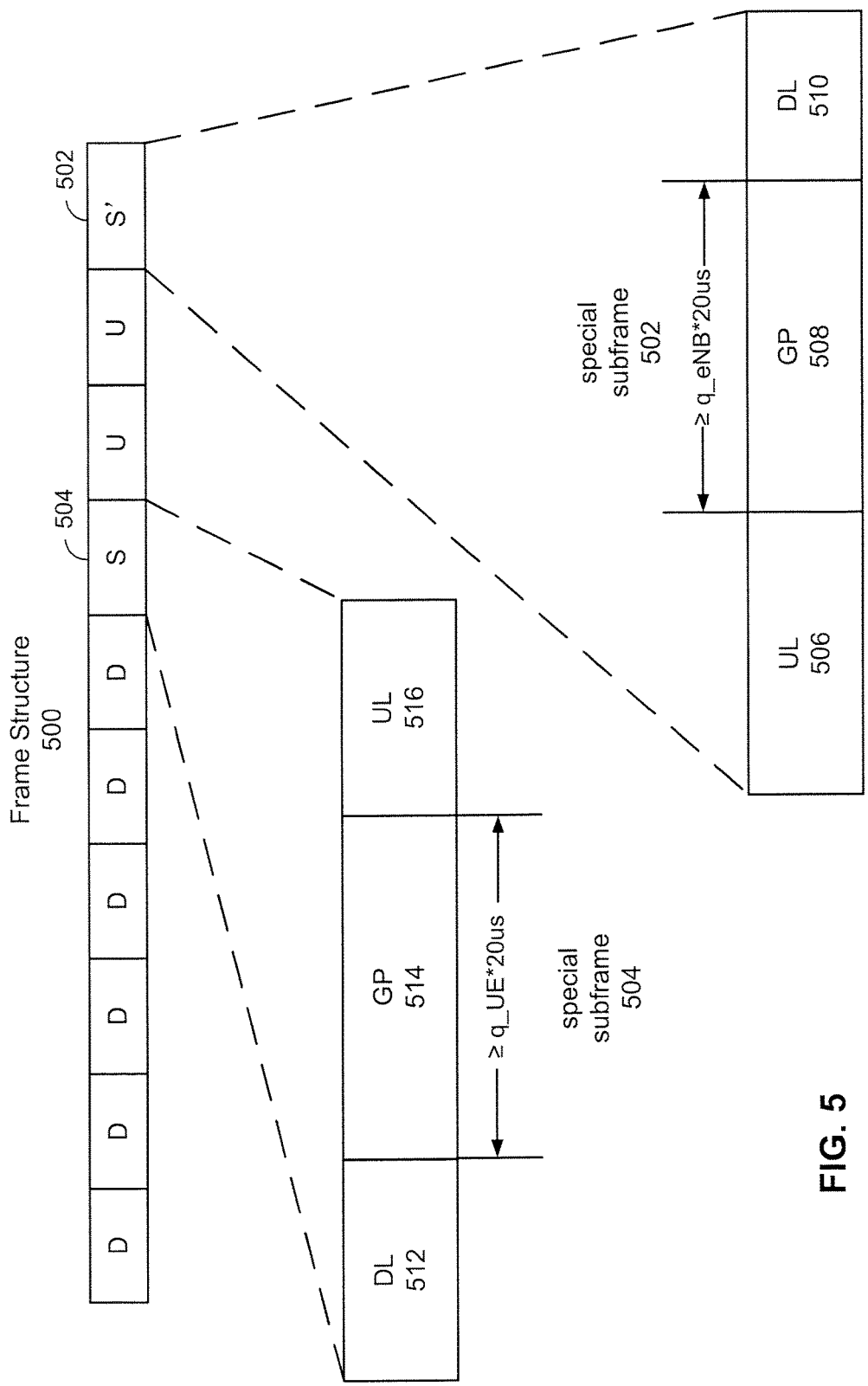
FIG. 5 illustrates examples of special subframes of a frame structure in which special subframe configuration may be implemented.

FIG. 5 illustrates examples of special subframes of a frame structure in which special subframe configuration may be implemented. As depicted, frame structure 500 may include one or more downlink subframes (D) for data transmission from the eNB, e.g., small cell base station 400 or 110B, to the UE, e.g., UE 460, one or more uplink subframes (U) for data transmission from the UE to the eNB, a special subframe 502 (S'), and a special subframe 504 (S). The frame structure 500 may be used in connection with, for example, one or more of the special subframe configuration managers 112 and 122 in FIG. 1. Special subframe 502 may include, at least, a UL portion 506 allocated for uplink communications, a GP portion 508 allocated for performing the ECCA check and potentially other purposes (e.g., switching from receiving to transmission and/or switching from transmission to receiving, etc.), and a DL portion 510 allocated for downlink communications (e.g., transmission of downlink channel usage beacon signals or D-CUBS). Special subframe 504 may include, at least, a DL portion 512 allocated for downlink communications, a GP portion 514 allocated for performing the ECCA check and potentially other purposes (e.g., switching from receiving to transmission and/or switching from transmission to receiving, etc.), and a UL portion 516 allocated for uplink communications (e.g., transmission of uplink channel usage beacon signals or U-CUBS).

In an aspect of the present disclosure, the configuration of special subframe 502 and/or 504 may be determined, or in other words, supported, by a wireless communication specification, e.g., 3GPP standard. In another aspect, the special subframe configuration may be implemented separate from a particular wireless communication specification. As referenced herein, the configuration of special subframes may refer to the respective durations of the DL portion, the GP portion, and the UL portion included in a special subframe. One or more determined/supported special subframe configuration may be broadcasted, by a cell, in one or more system information broadcast (SIB) blocks to UE, e.g., user device 120C (FIG. 1), within the cell. Additionally, a UE may be further informed of a second special subframe configuration via a dedicated message when the previously received special subframe needs to be updated.

In another aspect of the disclosure, to accommodate the CCA/ECCA check operation, the duration of a GP portion of a special subframe may be determined in a configuration to be a function of a maximum idle period required by the ECCA check. As an example, the GP portion can be greater than the maximum idle period. The maximum idle period required by the ECCA check may be determined by multiplying the CCA observation time (e.g., 20 µs) by the above-identified upper limit integer, q.

In at least one aspect of the disclosure, q may be configured to have different values for special subframe 502 and 504 respectively, e.g., $q_{eNB}$ for the eNB and $q_{UE}$ for the UE. As such, the durations for GP portions 508 and 514 may be configured differently. For example, the duration of GP portion 508 may be configured by special subframe configuration manager 112 to be equal to or greater than $q_{eNB} \times 20$ µs and the duration of GP portion 514 may be configured by special subframe configuration manager 122 to be equal to or greater than $q_{UE} \times 20$ µs. The value of 20 µs is the duration of for CCA check. Other values for CCA check are also possible, e.g., 18 µs, and if so, the corresponding value of $q_{eNB} \times 18$ µs or $q_{UE} \times 18$ µs should be used. Since q indicates a maximum value from which N can be selected from and presumably stays invariable, the durations of GP portions 508 and 514 may thus be greater than any duration required by the ECCA check.

As referenced herein, the configuration based on the value of q may be referred to as "semi-static configuration" hereinafter.

FIG. 6 illustrates other examples of special subframes of a frame structure in which special subframe configuration may be implemented. As depicted, frame structure 600 may include one or more downlink subframes (D) for data transmission from the eNB to the UE, one or more uplink subframes (U) for data transmission from the UE to the eNB, a special subframe 602 (S'), and a special subframe 604 (S). The frame structure 600 may be used in connection with, for example, one or more of the special subframe configuration managers 112 and 122 in FIG. 1. Special subframe 602 may include, at least, a UL portion 606 allocated for uplink communication, a GP portion 608 allocated for performing the ECCA check and potentially other purposes (e.g., switching from receiving to transmission and/or switching from transmission to receiving), and a DL portion 610 for downlink communications (e.g., transmission of downlink channel usage beacon signals or D-CUBS). Special subframe 604 may include, at least, a DL portion 612 allocated for downlink communications, a GP portion 614 allocated for performing the ECCA check and potentially other purposes (e.g., switching from receiving to transmission and/or switching from transmission to receiving, etc.), and a UL portion 616 allocated for uplink communications (e.g., transmission of uplink channel usage beacon signals or U-CUBS).

Alternative to the previous example described in accordance with FIG. 5, the GP portion of a special subframe may be configured based on the randomly selected integer N to better accommodate the CCA/ECCA check requirement and to provide more efficient system resource utilization.

Unlike the value of q that is selected by the manufacturer of the node or the equipment, the value of N may be different in different frames or in different subframes. For example, in frame structure 600, N may be determined in the ECCA check to be different for special subframe 602 and 604, e.g., N may be determined to be 15 for special subframe 602 ($N_{eNB}$) and 10 for special subframe 604 ($N_{UE}$). Accordingly, GP portion 608 may be configured to be equal to or greater than $N_{eNB} \times 20$ µs and GP portion 614 may be configured to be equal to or greater than $N_{UE} \times 20$ µs.

In a further aspect of the disclosure, GP portions 608 and 614 may be configured to be greater, by a time offset, than the above calculated result to accommodate other requirements, e.g., inter-cell interference protection, UL timing advance, etc.

In a further aspect of the disclosure, the above calculated result for GP portions 608 and 614 may be lower bounded by a predetermined or configurable value to accommodate other requirements, e.g., inter-cell interference protection, UL timing advance, etc. As a result, it is possible to derive the special subframe configuration based on max(f(N), min_GP), where min_GP can be specified or configured as described above and f(N) may refer to a function that considers the accommodation of the above-mentioned requirements. As an example, f(N)=c1*N+c0, where c1 and c0 are constants derived based on channel clearance assessment needs.

As referenced herein, the configuration based on the value of N may be referred to as "dynamic configuration" hereinafter.

Additionally or alternatively, different special subframes within a frame structure may be respectively configured in accordance with "semi-static configuration" and "dynamic configuration." That is, for example, special subframe 602 may be configured based on the value of q while special subframe 604 may be configured based on the value of N. Moreover, the frame structures 500 and 600 have been provided by way of illustration and not of limitation. Other frame structures may also be used in connection with special frame configuration in unlicensed spectrum.

Figure 7:
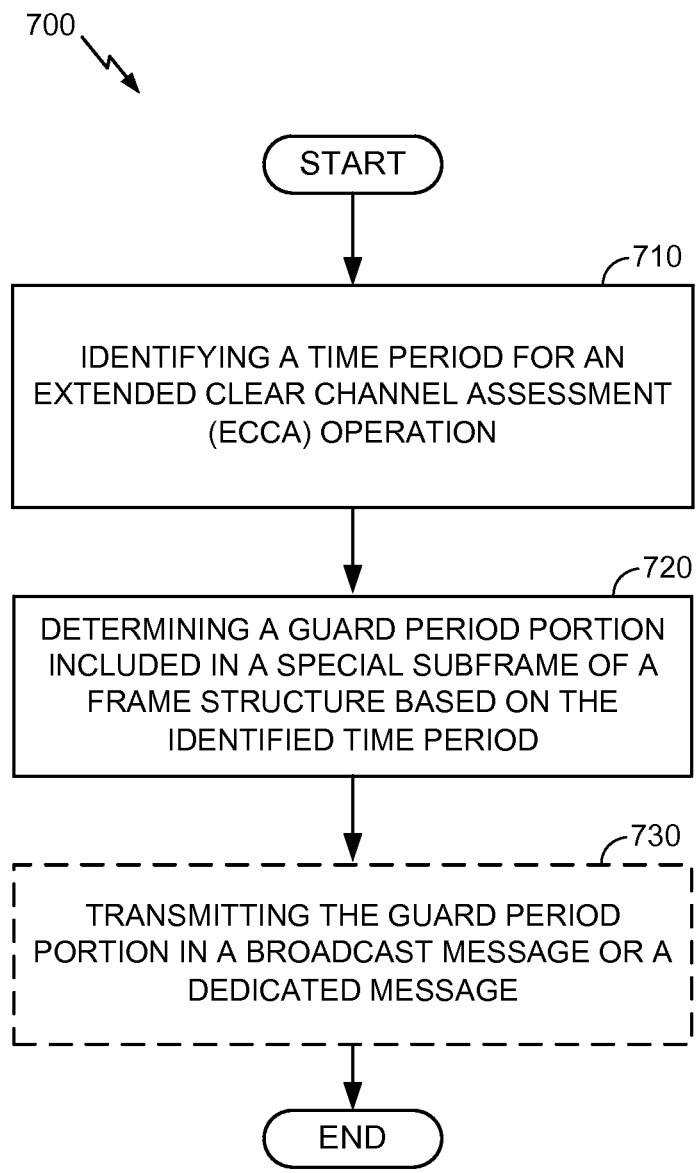
FIG. 7 is a flow diagram that represents an example methodology by which the special subframe configuration may be implemented.

FIG. 7 is a flow diagram illustrating an example method of special subframe configuration in unlicensed spectrum. The method 700 may be performed, for example, by a base station (e.g., small cell base station 110B illustrated in FIG. 1) or by a UE (e.g., user device 120C illustrated in FIG. 1).

Block 710 (Identify time period) may refer to small cell base station 110B or components thereof, e.g., special subframe configuration manager 112, identifying a time period for an ECCA check based on the value of N or the value of q. Alternatively, Block 710 may also refer to user device 120C or components thereof, e.g., special subframe configuration manager 122, identifying the time period for an ECCA check based on the value of N or the value of q.

As described above, special subframe configuration manager 112 may be configured to determine a time period of the respective special subframe. For example, the time period for special subframe 502 may be configured by special subframe configuration manager 112 to be equal than $q_{eNB}$-20 µs and the time period for special subframe 504 may be configured by special subframe configuration manager 122 to be equal to $q_{UE} \times 20$ µs. Further, with respect to frame structure 600, the time period for special subframe 602 may be configured to be equal to $N_{eNB} \times 20$ µs and the time period for special subframe 604 may be configured to be equal to $N_{UE} \times 20$ µs.

Block 720 (Determine Guard Period) may refer to special subframe configuration manager 112 of small cell base station 110B determining a GP portion of a special subframe based on the identified time period. Alternatively, Block 720 may also refer to special subframe configuration manager 122 of user device 120C determining a GP portion of a special subframe based on the identified time period.

In addition to the time period, special subframe configuration manager 112 or 122 may further consider other factors including inter-cell interference protection, UL timing advance, etc. Thus, the GP portion may be determined to be equal to or greater than the identified time period.

In an non-limiting example of the disclosure, assuming a symbol requires 71 µs, the value of N is selected as 20, and the ECCA observation time is specified as 20 µs, the duration of the GP portion may then be determined by the following equation:

$$\text{Duration of GP portion} = \text{ceiling}\left(\frac{N \times ECCA \text{ observation time}}{\text{duration of a symbol}}\right) + 1$$

in which ceiling (x) may refer to a smallest integer not less than x. Accordingly, the duration of the GP portion is determined to be ceiling (400/71)+1 symbols, i.e., 7 symbols.

Block 730 (Transmit Guard Period Information) may refer to special subframe configuration manager 112 transmitting the configuration including the durations of the GP portions of respective special subframe to UE within a corresponding cell. In at least some aspects, the configuration may be transmitted in SIB blocks or in dedicated messages.

Figure 8:
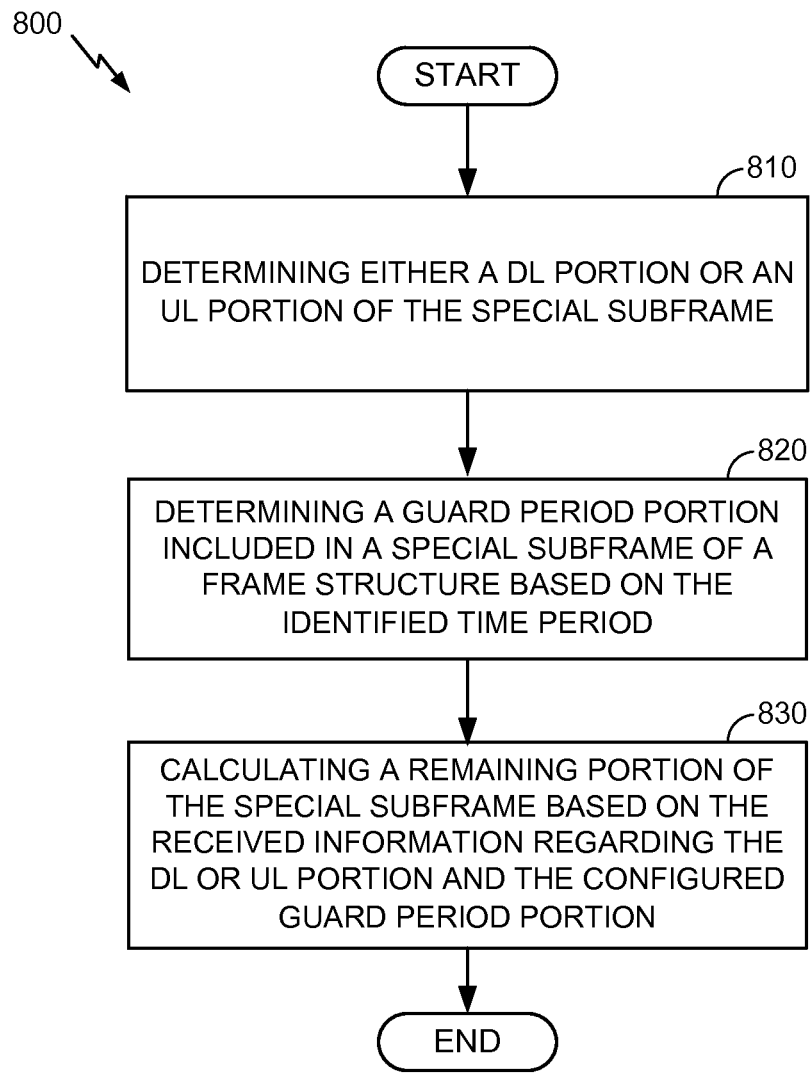
FIG. 8 is a flow diagram that represents an example methodology by which the special subframe configuration may be implemented.

FIG. 8 is a flow diagram illustrating an example method of special subframe configuration in unlicensed spectrum. The method 800 may be performed, for example, by a user device (e.g., user device 120C illustrated in FIG. 1).

Block 810 (Receive UL/DL information) may refer to user device 120C or components thereof, e.g., special subframe configuration manager 122, receiving information regarding UL portion 616 and DL portion 610 via SIB blocks or dedicated messages.

Block 820 (Identify Time Period) may refer to special subframe configuration manager 122 identifying a time period based on the value of q or the value of N. In either aspect, the duration of the time period may be identified and thus, GP portions 608 and 614 may be further determined based on the time period and other above identified considerations.

Block 830 (Calculate Remaining Portion) may refer to special subframe configuration manager 122 calculating remaining portions of the respective special subframe, assuming the duration of a special subframe is 1 ms. That is, UL portion 606 of special subframe 602 may be calculated by subtracting the duration of GP portion 608 and DL portion 610 from 1 ms. Similarly, DL portion 612 of special subframe 604 may be calculated by subtracting the duration of GP portion 614 and UL portion 616 from 1 ms.

Figure 9:
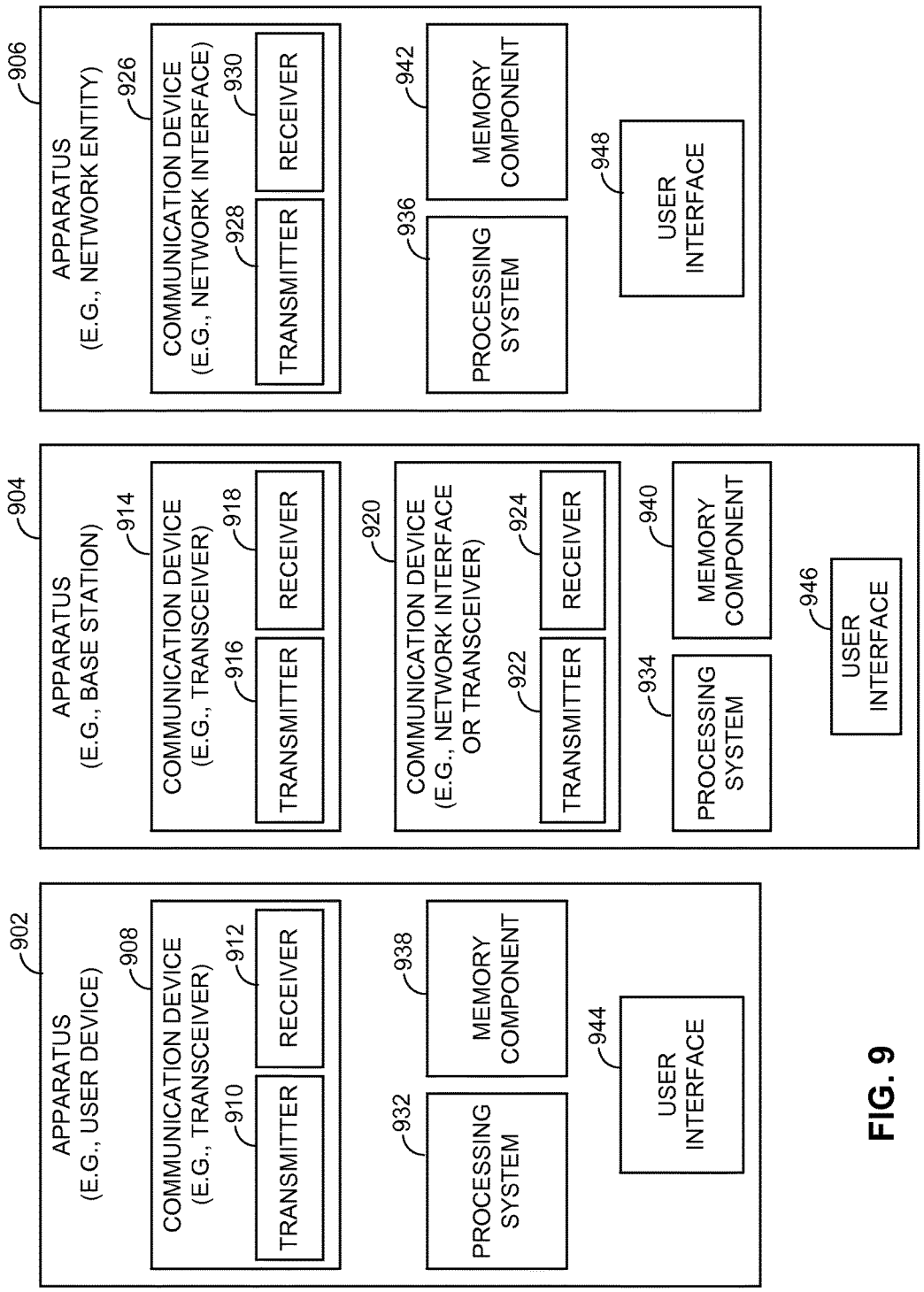
FIG. 9 is a simplified block diagram of several sample aspects of components that may be employed in communication nodes and configured to support communication as taught herein.

FIG. 9 illustrates several sample components (represented by corresponding blocks) that may be incorporated into an apparatus 902, an apparatus 904, and an apparatus 906 (corresponding to, for example, a user device, a base station, and a network entity, respectively) to support the special subframe configuration operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 902 and the apparatus 904 each include at least one wireless communication device (represented by the communication devices 908 and 914 (and the communication device 920 if the apparatus 904 is a relay)) for communicating with other nodes via at least one designated RAT. Apparatus 902 may refer to user device 120C in FIG. 1 and apparatus 904 may refer to small cell base station 110B. Each communication device 908 includes at least one transmitter (represented by the transmitter 910) for transmitting and encoding signals (e.g., messages, indications, information, and so on) and at least one receiver (represented by the receiver 912) for receiving and decoding signals (e.g., messages, indications, information, pilots, and so on). Similarly, each communication device 914 includes at least one transmitter (represented by the transmitter 916) for transmitting signals (e.g., messages, indications, information, pilots, and so on) and at least one receiver (represented by the receiver 918) for receiving signals (e.g., messages, indications, information, and so on). If the apparatus 904 is a relay station, each communication device 920 may include at least one transmitter (represented by the transmitter 922) for transmitting signals (e.g., messages, indications, information, pilots, and so on) and at least one receiver (represented by the receiver 924) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 904 may also comprise a Network Listen Module (NLM) or the like for performing various measurements.

The apparatus 906 (and the apparatus 904 if it is not a relay station) includes at least one communication device (represented by the communication device 926 and, optionally, 920) for communicating with other nodes. For example, the communication device 926 may comprise a network interface that is configured to communicate with one or more network entities via a wire-based or wireless backhaul. In some aspects, the communication device 926 may be implemented as a transceiver configured to support wire-based or wireless signal communication. This communication may involve, for example, sending and receiving: messages, parameters, or other types of information. Accordingly, in the example of FIG. 9, the communication device 926 is shown as comprising a transmitter 928 and a receiver 930. Similarly, if the apparatus 904 is not a relay station, the communication device 920 may comprise a network interface that is configured to communicate with one or more network entities via a wire-based or wireless backhaul. As with the communication device 926, the communication device 920 is shown as comprising a transmitter 922 and a receiver 924.

The apparatuses 902, 904, and 906 also include other components that may be used in conjunction with the special subframe configuration operations as taught herein. The apparatus 902 includes a processing system 932 for providing functionality relating to, for example, special frame configuration manager 122 as taught herein and for providing other processing functionality. The apparatus 904 includes a processing system 934 for providing functionality relating to, for example, special frame configuration manager 112 as taught herein and for providing other processing functionality. The apparatus 906 includes a processing system 936 for providing functionality relating to, for example, network operations to support special subframe configuration as taught herein and for providing other processing functionality. The apparatuses 902, 904, and 906 include memory components 938, 940, and 942 (e.g., each including a memory device), respectively, for maintaining information (e.g., information indicative of reserved resources, thresholds, parameters, and so on). In addition, the apparatuses 902, 904, and 906 include user interface devices 944, 946, and 948, respectively, for providing indications (e.g., audible and/or visual indications) to a user and/or for receiving user input (e.g., upon user actuation of a sensing device such a keypad, a touch screen, a microphone, and so on).

For convenience, the apparatuses 902, 904, and/or 906 are shown in FIG. 9 as including various components that may be configured according to the various examples described herein. It will be appreciated, however, that the illustrated blocks may have different functionality in different designs.

The components of FIG. 9 may be implemented in various ways. In some implementations, the components of FIG. 9 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 908, 932, 938, and 944 may be implemented by processor and memory component(s) of the apparatus 902 (e.g., by execution of appropriate code and/or by appropriate configuration of processor components). Similarly, some or all of the functionality represented by blocks 914, 920, 934, 940, and 946 may be implemented by processor and memory component(s) of the apparatus 904 (e.g., by execution of appropriate code and/or by appropriate configuration of processor components). Also, some or all of the functionality represented by blocks 926, 936, 942, and 948 may be implemented by processor and memory component(s) of the apparatus 906 (e.g., by execution of appropriate code and/or by appropriate configuration of processor components).

Figure 10:
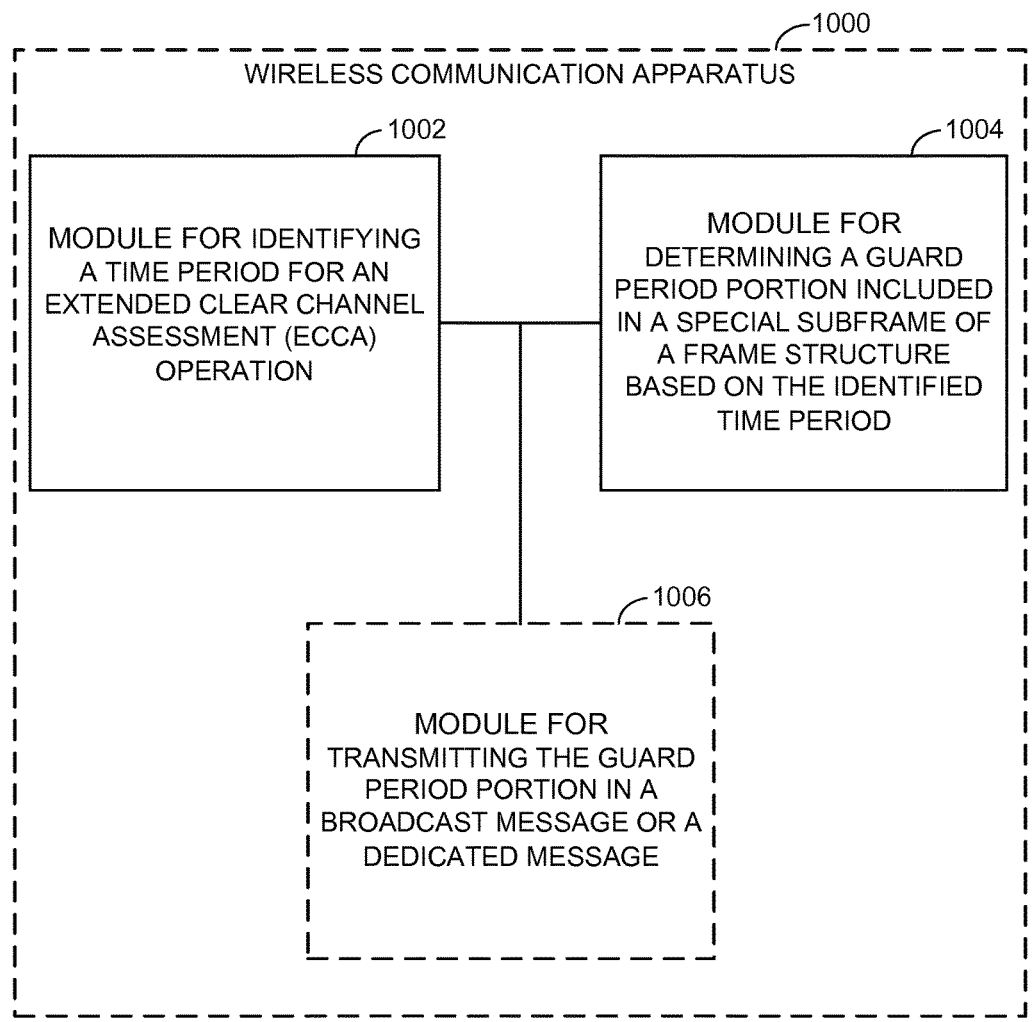
FIGS. 10 and 11 are other simplified block diagrams of several sample aspects of apparatuses configured to support communication as taught herein.

FIG. 10 illustrates an example wireless communication apparatus 1000 represented as a series of interrelated functional modules. Wireless communication apparatus 1000 may refer to a base station or a UE in some examples. A module for identifying a time period for an ECCA operation 1002 may correspond at least in some aspects to, for example, a special subframe configuration manager 112 as discussed herein. A module for determining a guard period portion included in a special subframe of a frame structure based on the identified time period 1004 may correspond at least in some aspects to, for example, special subframe configuration manager 112 as discussed herein. A module for transmitting the guard period portion in a broadcast message or a dedicated message 1006 may correspond at least in some aspects to, for example, special subframe configuration manager 112 as discussed herein.

Figure 11:
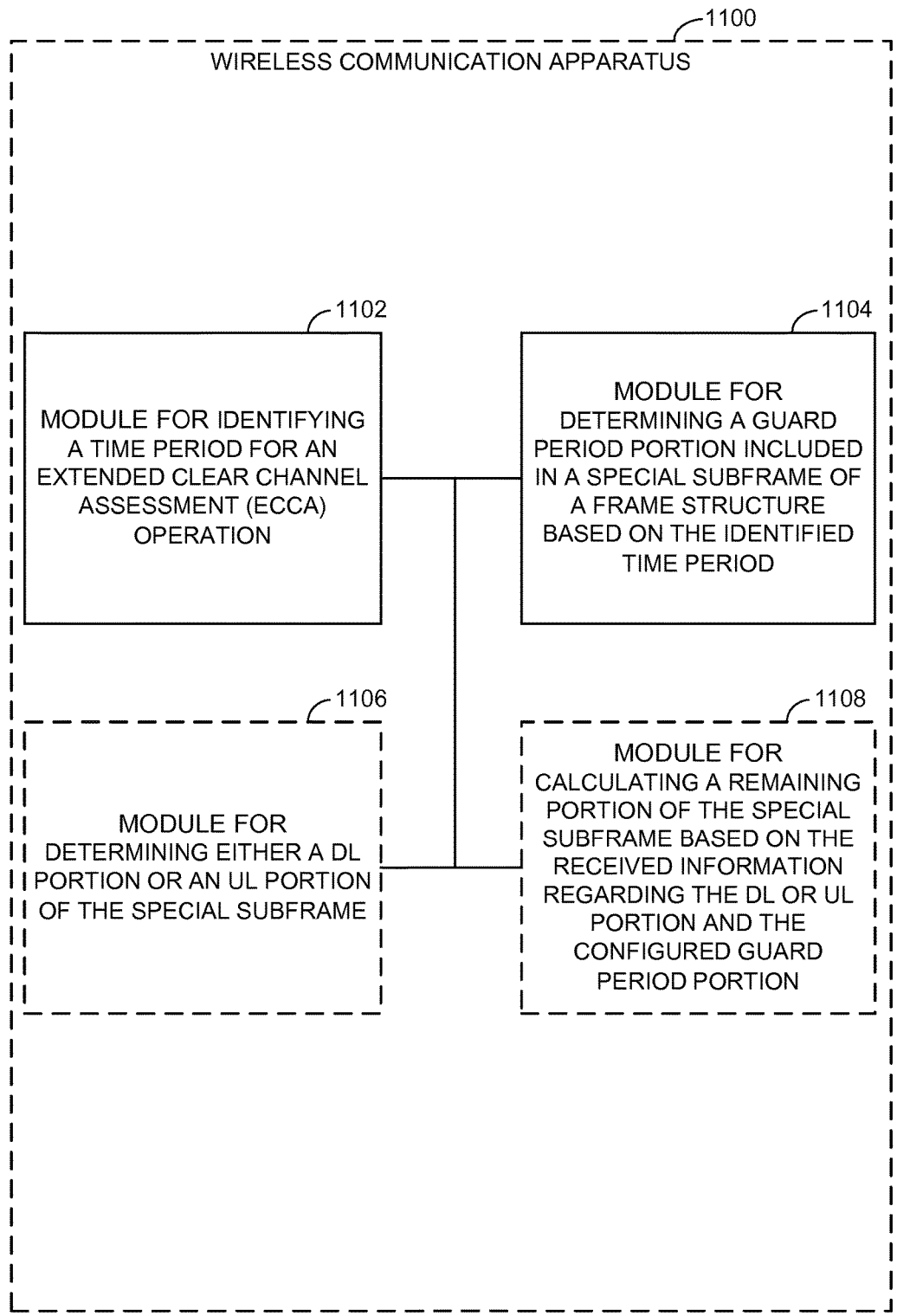

FIG. 11 illustrates an example wireless communication apparatus 1100 represented as a series of interrelated functional modules. In an aspect, wireless communication apparatus 1100 may refer to a UE. A module for identifying a time period for an ECCA operation 1102 may correspond at least in some aspects to, for example, a special subframe configuration manager 122 as discussed herein. A module for determining a guard period portion included in a special subframe of a frame structure based on the identified time period 1104 may correspond at least in some aspects to, for example, special subframe configuration manager 122 as discussed herein. A module for determining either a DL portion or an UL portion of the special subframe 1106 may correspond at least in some aspects to, for example, special subframe configuration manager 122 as discussed herein. A module for calculating a remaining portion of the special subframe based on the received information regarding the DL or UL portion and the configured guard period portion 1108 may correspond at least in some aspects to, for example, special subframe configuration manager 122 as discussed herein.

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein.

Figure 12:
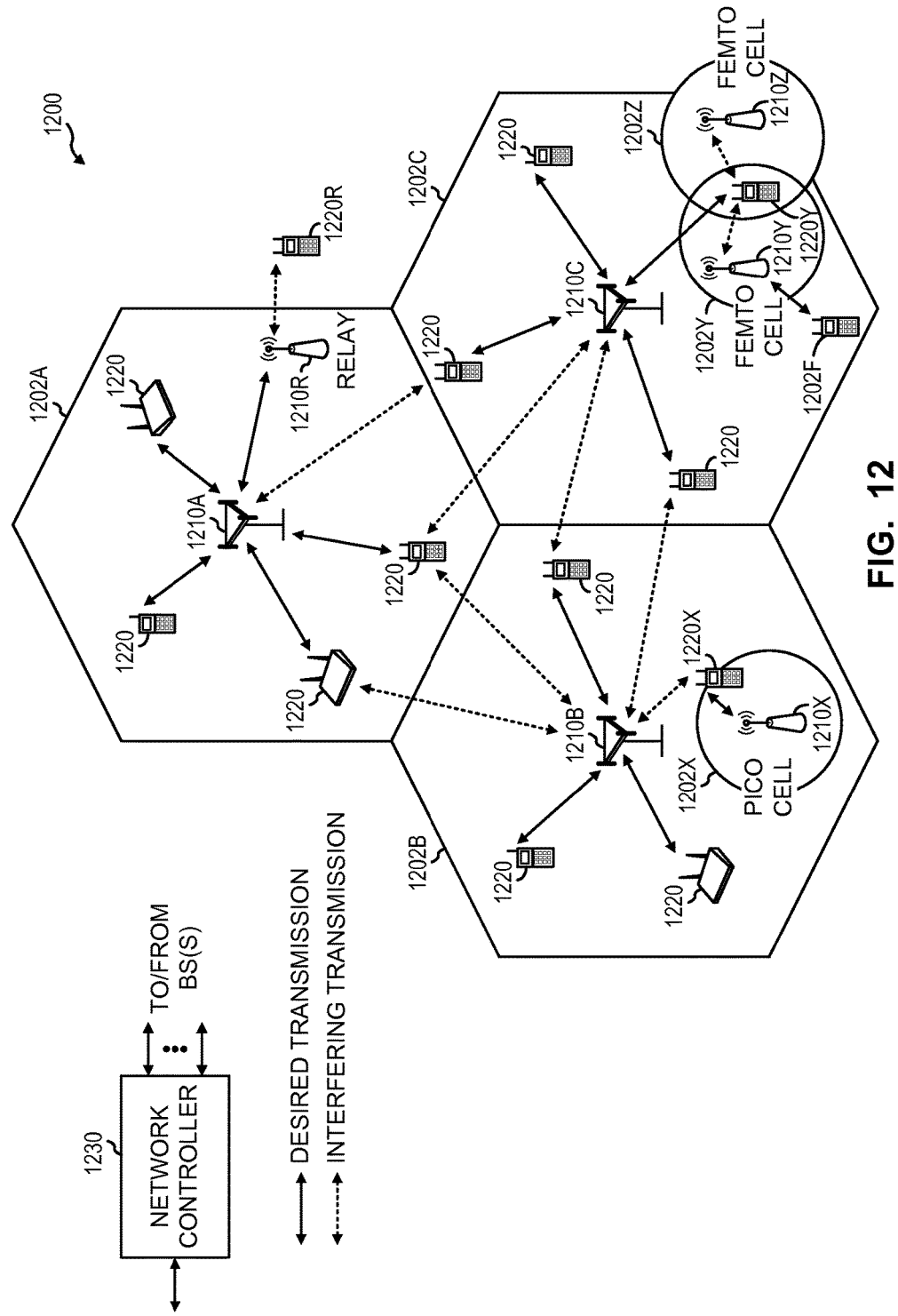
FIG. 12 illustrates an example communication system environment in which the teachings and structures herein may be may be incorporated.

FIG. 12 illustrates an example communication system environment in which the special subframe configuration teachings and structures herein may be may be incorporated. The wireless communication system 1200, which will be described at least in part as an LTE network for illustration purposes, includes a number of eNBs 1210 and other network entities. Each of the eNBs 1210 provides communication coverage for a particular geographic area, such as macro cell or small cell coverage areas.

In the illustrated example, the eNBs 1210A, 1210B, and 1210C are macro cell eNBs for the macro cells 1202A, 1202B, and 1202C, respectively. The macro cells 1202A, 1202B, and 1202C may cover a relatively large geographic area (e.g., several kilometers in radius) and may allow unrestricted access by UEs with service subscription. The eNB 1210X is a particular small cell eNB referred to as a pico cell eNB for the pico cell 1202X. The pico cell 1202X may cover a relatively small geographic area and may allow unrestricted access by UEs with service subscription. The eNBs 1210Y and 1210Z are particular small cells referred to as femto cell eNBs for the femto cells 1202Y and 1202Z, respectively. The femto cells 1202Y and 1202Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below.

The wireless network 1200 also includes a relay station 1210R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 12, the relay station 1210R communicates with the eNB 1210A and a UE 1220R in order to facilitate communication between the eNB 1210A and the UE 1220R. A relay station may also be referred to as a relay eNB, a relay, etc.

The wireless network 1200 is a heterogeneous network in that it includes eNBs of different types, including macro eNBs, pico eNBs, femto eNBs, relays, etc. As discussed in more detail above, these different types of eNBs may have different transmit power levels, different coverage areas, and different impacts on interference in the wireless network 1200. For example, macro eNBs may have a relatively high transmit power level whereas pico eNBs, femto eNBs, and relays may have a lower transmit power level (e.g., by a relative margin, such as a 10 dBm difference or more).

Returning to FIG. 12, the wireless network 1200 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1230 may couple to a set of eNBs and provide coordination and control for these eNBs. The network controller 1230 may communicate with the eNBs 1210 via a backhaul. The eNBs 1210 may also communicate with one another, e.g., directly or indirectly via a wireless or wireline backhaul.

As shown, the UEs 1220 may be dispersed throughout the wireless network 1200, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 12, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1220Y may be in proximity to femto eNBs 1210Y, 1210Z. Uplink transmissions from UE 1220Y may interfere with femto eNBs 1210Y, 1210Z. Uplink transmissions from UE 1220Y may jam femto eNBs 1210Y, 1210Z and degrade the quality of reception of other uplink signals to femto eNBs 1210Y, 1210Z.

Small cell eNBs such as the pico cell eNB 1210X and femto eNBs 1210Y, 1210Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto eNB 1210Y may be an open-access femto eNB with no restricted associations to UEs. The femto eNB 1210Z may be a higher transmission power eNB initially deployed to provide coverage to an area. Femto eNB 1210Z may be deployed to cover a large service area. Meanwhile, femto eNB 1210Y may be a lower transmission power eNB deployed later than femto eNB 1210Z to provide coverage for a hotspot area (e.g., a sports arena or stadium) for loading traffic from either or both eNB 1210C, eNB 1210Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the process or (e.g., cache memory).

Accordingly, it will also be appreciated, for example, that certain aspects of the disclosure can include a computer-readable medium embodying a method for special subframe configuration.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for configuring special subframes in a wireless communication system, comprising:
    identifying, by a load-based equipment (LBE), a time period for an extended clear channel assessment (ECCA) operation that determines whether a channel is clear for data communication, wherein the time period for the ECCA operation is based on an integer, the integer being randomly selected from a range between one and an upper limit integer or is an integer associated with a network entity;
    determining, by the LBE, a special subframe configuration for a special subframe of a frame structure and a guard period portion included in the special subframe based on the integer, the special subframe comprising an uplink (UL) portion, the guard period portion and a downlink (DL) portion; and
    transmitting, by the LBE via a broadcast message or a dedicated message, the special subframe configuration including a duration for the guard period portion that is equal to or greater than the identified time period,
    wherein a device receiving the transmitted broadcast message or dedicated message performs the ECCA operation in accordance to the identified time period.

2. The method of claim 1, wherein identifying the time period for the ECCA operation includes calculating, by the LBE, the time period by multiplying a clear channel assessment (CCA) observation time by the randomly selected integer.

3. The method of claim 1, wherein the guard period portion is determined dynamically in a frame-by-frame or a subframe-by-subframe basis.

4. The method of claim 1, wherein identifying the time period for the ECCA operation includes calculating, by the LBE, the time period by multiplying a CCA observation time by the integer associated with the network entity.

5. The method of claim 1, wherein determining the guard period portion includes determining the guard period portion based on at least one of a time offset or a minimal duration of the guard period portion.

6. The method of claim 1, wherein determining the guard period portion includes determining the guard period portion based on a set of supported guard periods.

7. The method of claim 6, wherein transmitting the duration for the guard period portion further comprises transmitting durations for the set of supported guard periods in a broadcast message or a dedicated message.

8. The method of claim 1, further comprising:
    determining, by the LBE, either the DL portion or the UL portion of the special subframe; and
    calculating, by the LBE, a remaining portion of the special subframe based on the determined guard period portion and the determined DL portion or UL portion.

9. The method of claim 8, wherein determining either a DL portion or an UL portion of the special subframe is based on information indicated in the broadcast message or the dedicated message.

10. The method of claim 1, wherein determining the guard period portion in the special subframe includes determining a guard period for a downlink ECCA operation or for an uplink ECCA operation.

11. The method of claim 1, further comprising identifying two or more sets of supported guard periods corresponding to two or more special subframes based on signaling received from a network entity.

12. The method of claim 1, wherein the duration for the guard period portion equals one plus ceiling of (the randomly selected integer times the ECCA observation time divided by a duration of a symbol).

13. An apparatus for configuring special subframes in a wireless communication system, comprising:
 means for identifying a time period for an extended clear channel assessment (ECCA) operation that determines whether a channel is clear for data communication, wherein the time period for the ECCA operation is based on an integer, the integer being randomly selected from a range between one and an upper limit integer or an integer associated with a network entity;
 means for determining a special subframe configuration for a special subframe of a frame structure and a guard period portion included in the special subframe based on the integer, the special subframe comprising an uplink (UL) portion, the guard period portion and a downlink (DL) portion; and
 means for transmitting, via a broadcast message or a dedicated message, the special subframe configuration including a duration for the guard period portion that is equal to or greater than the identified time period,
 wherein a device receiving the transmitted broadcast message or dedicated message performs the ECCA operation in accordance to the identified time period.

14. The apparatus of claim 13, wherein the means for identifying the time period for the ECCA operation includes means for calculating the time period by multiplying a clear channel assessment (CCA) observation time by the randomly selected integer.

15. The apparatus of claim 13, wherein the guard period portion is determined dynamically in a frame-by-frame or a subframe-by-subframe basis.

16. The apparatus of claim 13, wherein the means for identifying the time period for the ECCA operation includes means for calculating the time period by a CCA observation time by the integer associated with the network entity.

17. The apparatus of claim 13, wherein the duration for the guard period portion equals one plus ceiling of (the randomly selected integer times the ECCA observation time divided by a duration of a symbol).

18. An apparatus for configuring special subframes in a wireless communication system, comprising:
 a memory configured to store instructions; and
 at least one processor communicatively coupled with the memory, wherein the at least one processor is configured to execute the instructions to:
  identify a time period for an extended clear channel assessment (ECCA) operation that determines whether a channel is clear for data communication, wherein the time period for the ECCA operation is based on an integer, the integer being randomly selected from a range between one and an upper limit integer or is an integer associated with a network entity;
  determine a special subframe configuration for a special subframe of a frame structure and a guard period portion included in the special subframe based on the integer, the special subframe comprising an uplink (UL) portion, the guard period portion and a downlink (DL) portion; and
  transmit, via a broadcast message or a dedicated message, the special subframe configuration including a duration for the guard period portion that is equal to or greater than the identified time period,
 wherein a device receiving the transmitted broadcast message or dedicated message performs the ECCA operation in accordance to the identified time period.

19. The apparatus of claim 18, wherein the at least one processor is configured to execute further instructions to calculate the time period by multiplying a clear channel assessment (CCA) observation time by the randomly selected integer.

20. The apparatus of claim 18, wherein the guard period portion is determined dynamically in a frame-by-frame or a subframe-by-subframe basis.

21. The apparatus of claim 18, wherein the at least one processor is configured to execute further instructions to calculate the time period by multiplying a CCA observation time by the integer associated with the network entity.

22. The apparatus of claim 18, wherein the duration for the guard period portion equals one plus ceiling of (the randomly selected integer times the ECCA observation time divided by a duration of a symbol).

23. A non-transitory computer-readable medium storing executable code for configuring special subframes in a wireless communication system, comprising instructions, that when executed by a processor, cause the processor to:
 identify a time period for an extended clear channel assessment (ECCA) operation that determines whether a channel is clear for data communication, wherein the time period for the ECCA operation is based on an integer, the integer being randomly selected from a range between one and an upper limit integer or is an integer associated with a network entity;
 determine a special subframe configuration for a special subframe of a frame structure and a guard period portion included in the special subframe based on the integer, the special subframe configuration comprising an uplink (UL) portion, the guard period portion and a downlink (DL) portion; and
 transmit, via a broadcast message or a dedicated message, the special subframe configuration including a duration for the guard period portion that is equal to or greater than the identified time period,
 wherein a device receiving the transmitted broadcast message or dedicated message performs the ECCA operation in accordance to the identified time period.

24. The non-transitory computer-readable medium of claim 23, further comprising instructions, that when executed by the processor, cause the processor to calculate the time period by multiplying a clear channel assessment (CCA) observation time by the randomly selected integer.

25. The non-transitory computer-readable medium of claim 23, wherein the guard period portion is determined dynamically in a frame-by-frame or a subframe-by-subframe basis.

26. The non-transitory computer-readable medium of claim 23, further comprising instructions, that when executed by the processor, cause the processor to calculate the time period by multiplying a CCA observation time by the integer associated with the network entity.

27. The non-transitory computer-readable medium of claim 23, wherein the duration for the guard period portion equals one plus ceiling of (the randomly selected integer times the ECCA observation time divided by a duration of a symbol).

\* \* \* \* \*